United States Patent [19]

Fujita et al.

[11] Patent Number: 4,654,087
[45] Date of Patent: Mar. 31, 1987

[54] METHOD OF AND APPARATUS FOR WASHING AIRPLANES

[75] Inventors: Kenji Fujita; Katsumi Kawase; Noboru Takigawa, all of Yokosuka, Japan

[73] Assignee: Sumitomo Heavy Industries, Ltd., Tokyo, Japan

[21] Appl. No.: 722,972

[22] Filed: Apr. 12, 1985

[30] Foreign Application Priority Data

Apr. 18, 1984 [JP] Japan .................................. 59-78257

[51] Int. Cl.$^4$ .............................................. B08B 7/00
[52] U.S. Cl. .......................................... 134/6; 134/9; 134/25.4; 15/DIG. 2; 15/53 AB; 15/21 R
[58] Field of Search ............................. 134/57 R, 6, 9; 15/DIG. 2, 53 AB, 21 R

[56] References Cited

U.S. PATENT DOCUMENTS

| | | |
|---|---|---|
| 3,460,177 | 8/1969 | Rhinehart et al. ..................... 15/21 |
| 3,551,934 | 1/1971 | Franzreb ................................. 15/97 |
| 3,601,832 | 8/1971 | Cook ...................................... 15/21 |
| 3,665,542 | 5/1972 | Franzreb ................................. 15/98 |
| 3,775,798 | 12/1973 | Thornton-Trump ................. 15/21 |
| 3,835,498 | 9/1974 | Arato ..................................... 15/21 |

*Primary Examiner*—Andrew H. Metz
*Assistant Examiner*—Sharon T. Cohen
*Attorney, Agent, or Firm*—Armstrong, Nikaido, Marmelstein & Kubovcik

[57] ABSTRACT

An apparatus for washing an airplane has a rectangular underground pit recessed below the ground surface, a turn table located at one end of the pit and rotatable at the same level as the ground surface, an upper washing unit for washing the upper side of the airplane and a lower washing unit for washing the lower side of the airplane. The upper washing unit has a carrier having a width and a height large enough to clear the tail wings of the airplane and is movable in the longitudinal direction of the pit, while the lower washing unit has a carrier which is movable within the pit in the longitudinal direction of the latter at a level substantially equal to the bottom of the pit. Each washing unit has washing means such as a brush movable on the carrier. The washing means of the lower washing unit is accessible to the lower side of the airplane through openings formed in the turn table.

7 Claims, 29 Drawing Figures

FIG. 1
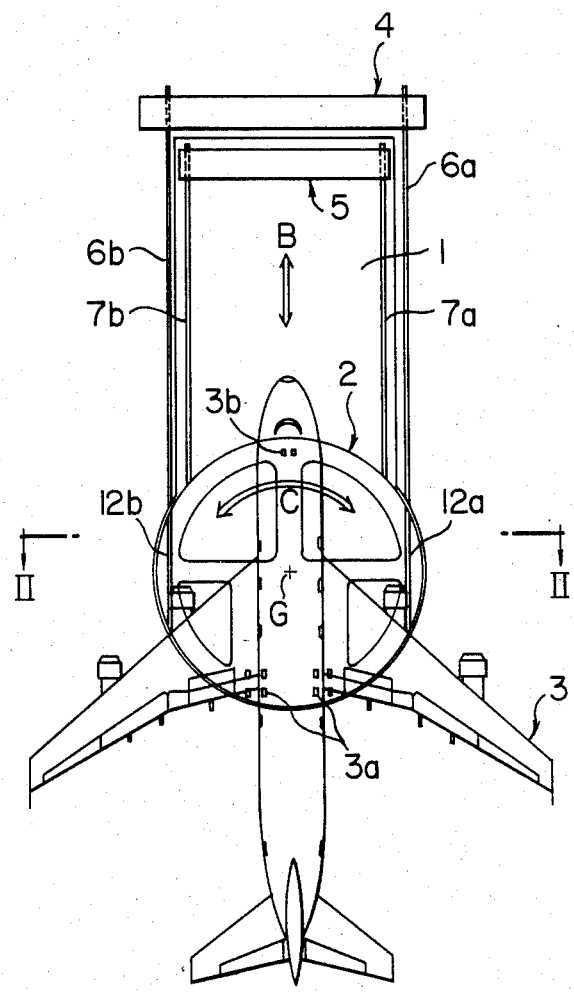

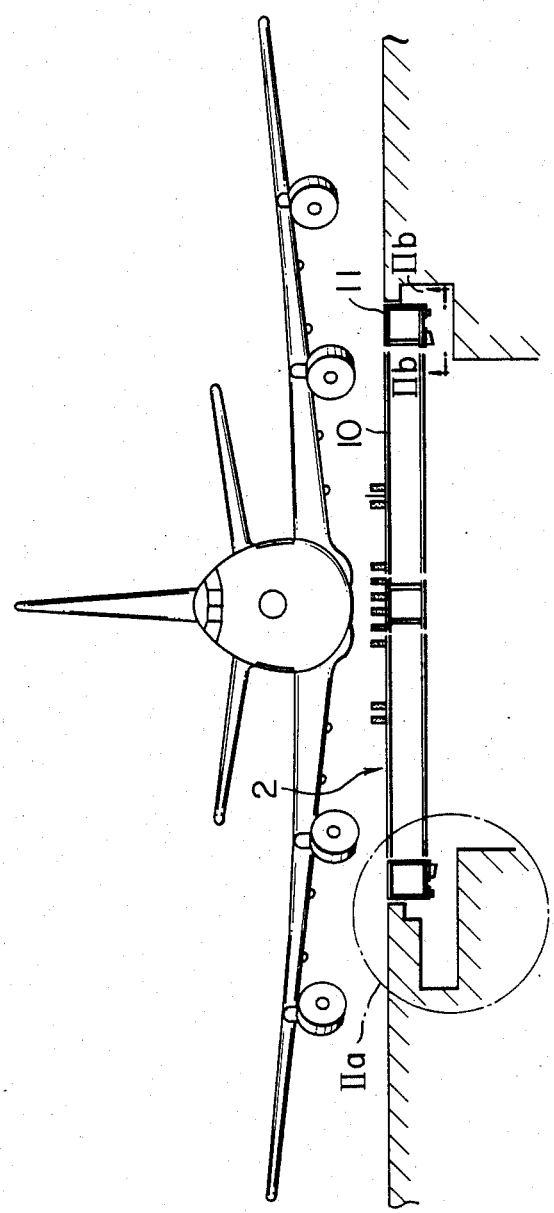

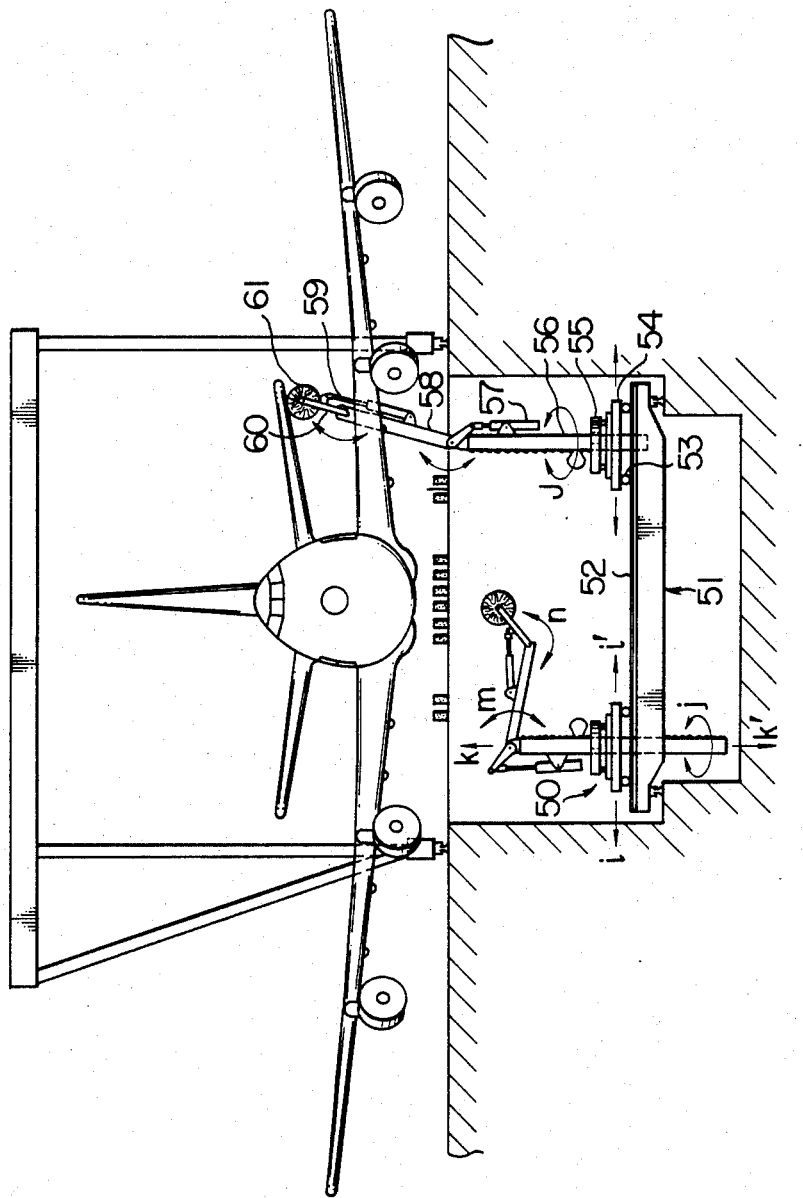

METHOD OF AND APPARATUS FOR WASHING AIRPLANES

BACKGROUND OF THE INVENTION

The present invention relates to an apparatus for washing and cleaning the external surface of an airplane.

Airplanes, particularly large-size passenger airplanes, should have their attractive appearance well maintained. The external surfaces of such airplanes should be kept as clean as possible to minimize air resistance and, hence, fuel consumption. The cleaning of the external surfaces is necessary also for the purpose of preventing rusting of the plates which constitute the external surface to ensure safety and longer life of the airplanes.

The contamination of external surfaces of airplanes is unavoidable because the sticky components of the exhaust gases from the engine stick to the external surface and because the dust and other particles suspended in the air often penetrate the surface coating of the airplane.

In order, therefore, to maintain the attractive appearance of the airplane while achieving the prevention of rusting and fuel saving, it is necessary to conduct washing and cleaning of the external surface of the airplane periodically.

At the present stage, the washing of airplanes is conducted by manual labor. Although proposals have been made for the mechanization and automation of the cleaning work, none of these proposals has been put into practical use.

These known proposals have the following features:

(1) The washing apparatus is situated on the ground, i.e. at the same level as the airplane.

(2) The washing apparatus has a plurality of washing units which operate independently. These units are arranged to clean different portions of the airplane, such as the nose, tail, main wings and tail wings of the airplane. In some cases, separate units are used for washing the upper and lower sides of the main wings, respectively.

(3) Various measures are taken to bring the washing means such as brushes into contact with the airplane. For instance, the washing means are movably mounted to the stationary structure of a building into which the airplane is taxied, and the washing means are then moved along the airplane. Alternatively, the cleaning means are mounted on a crane or vehicle which can approach and move along the airplane while it is stationed at an apron for washing.

These proposals suffer from the following common disadvantages.

(1) Since the washing apparatus is situated at the same level as the airplane on the ground, it is quite difficult to allow sufficient space or height, particularly for the washing unit for washing the lower side of the airplane, although a sufficient space may be provided for the washing unit which cleans the upper side of the airplane. Consequently, the washing unit for the lower side of the airplane has only a small adaptability to the configuration of the lower side of the airplane, as compared with the unit for washing the upper side of the airplane. In some cases, the washing unit cannot access the lowermost part of the body of the airplane where the clearance above the ground surface is very small.

(2) The use of independent washing units for various parts of the airplane has been proposed as a solution to the problem encountered in adapting a single or several washing means such as brushes to various parts of airplanes having various configurations. If such a difficulty could be overcome, it would be preferable to reduce as much as possible the number of the washing units from the view point of economy, saving of human labour and simplification of the whole apparatus.

(3) When a multiplicity of washing units are used in a house or the like, the house must be of a huge size with an impractically large span between supporting pillars, because the building has to accomodate a multiplicity of washing units, as well as an airplane which is very large. The large span between the pillars necessitates higher rigidity of the beams and girders of the building structure. Thus, this proposal requires an impractically large financial investment. The use of a plurality of washing means carried by mobile carriers accessible to an airplane, e.g. cranes or trucks, also suffers from the problem relating to the difficulty in washing the lower side of the airplane as mentioned in (1) above, as well as the necessity for a multiplicity of washing units as mentioned in (2) above. Moreover, it is difficult to automate the cleaning work with a multiplicity of cleaning units carried by a crane or trucks and, accordingly, the effect of cleaning unfavourably depends on the skill or experience of the operator.

SUMMARY OF THE INVENTION

Accordingly, it is an object of the invention to provide a method of and apparatus for cleaning airplanes, improved to permit only a few washing means to wash and clean every portion of an airplane with a high adaptability to the configuration of the airplane, thereby overcoming the problems of the prior art.

To this end, according to one aspect of the invention, there is provided a method of cleaning an airplane using a turn-table rotatable on the ground surface, and upper and lower washing units which are movable with respect to the turn-table within a limited range, the method comprising: stationing the airplane on the turn table and washing portions of the upper and lower sides of the airplane accessible by the washing unit; rotating the turn-table by a predetermined angle and washing portions of the upper and lower sides of the airplane which have thereby become accessible by the washing units; and further rotating the turn table intermittently to make different portions of the upper and lower sides of the airplane accessible by the washing units thereby to wash all portions of the upper and lower sides of the airplane.

According to another aspect of the invention, there is provided an apparatus for washing an airplane comprising: a rectangular underground pit recessed below the ground surface; a turn-table disposed at one longitudinal end of the pit and rotatable at the same level as the ground surface; an upper carrier having a width and a height large enough to clear at least the tail wings of the airplane stationed on the turn-table and movable in the longitudinal direction of the pit; a lower carrier disposed in the pit and movable in the longitudinal direction of the pit; and at least one washing means movably carried by each of the upper and lower carriers.

Other objects, features and advantages of the invention will become clear from the following description of the embodiment when the same is read in conjunction with the accompanying drawings.

BRIEF DESCRIPTION OF THE DRAWINGS

FIG. 1 is a schematic plan view of an embodiment of the invention;

FIG. 2 is a front elevational view of the embodiment shown in FIG. 1;

FIG. 7 is a front elevational view showing the detail of a lower washing unit incorporated in the embodiment shown in FIG. 1;

DESCRIPTION OF THE PREFERRED EMBODIMENT

Figure 2A:
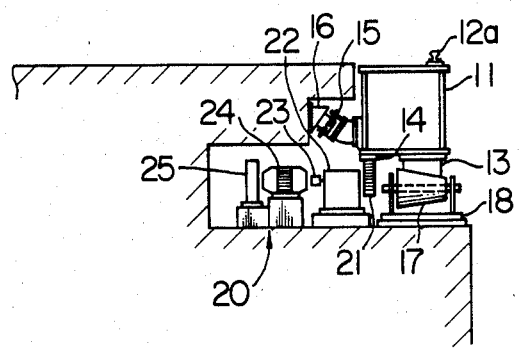
FIG. 2a is an enlarged view of a portion of the embodiment encircled by a circle IIa.

Referring first to FIG. 1 which is a schematic plan view of the whole portion of a washing apparatus of the invention, the apparatus has an underground pit 1 recessed from the ground surface, and a turn-table apparatus 2. The airplane 3 is adapted to be moved to the washing position as indicated by an arrow A. Thus, the pit 1 is disposed on the opposite side of the turn-table apparatus 2 to the entrance for the airplane. The turn-table apparatus 2 has a turn-table 10 (see FIG. 2) which is so sized that the rear wheels 3a and the front wheels 3b of the airplane are simultaneously carried by the turn-table. Thus, the size of the turn-table 10 is large enough to carry the biggest airplanes, such as the Boeing 747 jet liner, so that it can, of course, carry other liners such as the Lockheed L-1011, Air-Bus A-300 and Douglas DC-10.

A lower washing unit 5 is adapted to run as indicated by arrows B on rails 7a and 7b which are laid on the bottom of the underground pit 1 along both sides of the latter. On the other hand, an upper washing unit 4 is adapted to run as indicated by arrows B on rails 6a and 6b which are laid on the ground surface along both sides of the underground pit 1. The airplane 3 illustrated in FIG. 1 is a Boeing 747.

The detail of each of the major parts of the washing apparatus will be described hereinunder. Referring to FIGS. 2 to 2b, the turn-table apparatus 2 has a turn-table 10 which is constituted by a turn-table frame 11, rails 12a, 12b, guide rail 13 and a rack 14. The stationary side of the turn-table apparatus 2 includes a plurality of main guide rollers 17, column 18 and a turn-table driving unit 20 which is adapted to rotate the turn table 10 as indicated by arrows C in FIG. 1.

The turn-table driving unit 20 has a prime mover which may be an electric motor. In such a case, as will be seen from FIG. 2a, the driving unit 20 has an electric motor 24, a speed reducer 22 connected to the output side of the motor 24 through a coupling 23, a pinion 21 fixed to the output shaft of the speed reducer 22, and a brake 25. In the illustrated embodiment, only one driving unit 20 is disposed at the circumference of the turn table.

Figure 3:
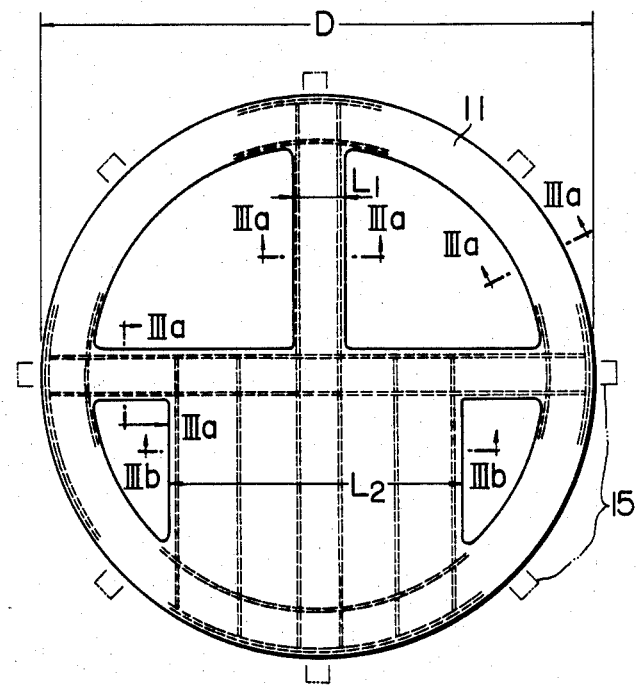
FIG. 3 is an enlarged plan view of a turn-table frame.
Figure 3A:
FIG. 3a is a sectional view taken along the line IIIa—IIIa of FIG. 3.
Figure 3B:
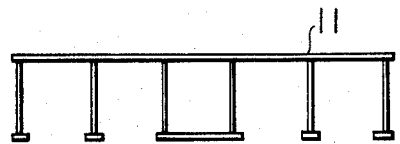
FIG. 3b is a sectional view taken along the line IIIb—IIIb of FIG. 3.

FIGS. 3, 3a and 3b show the frame construction of the turn-table frame 11. In order to provide a sufficient resistance to load including twisting load, the turn-table frame 11 has a box-girder type structure having box girders arranged on the circumference of the turn table and diametrically arranged girders crossing each other, as will be seen from FIG. 3. The width $L_1$ should be large enough to carry the front wheels 3b of the airplane 3, while the width $L_2$ should be large enough to accomodate the span of the rear wheels 3a of the airplane. The turn table 10 has a diameter D large enough to carry the front and rear wheels 3b, 3a of the airplane simultaneously.

As will be best seen from FIG. 2b, the guide rail 13 mentioned before is attached to the lower side of the turn-table frame 11 along the inner peripheral surface of the latter. The rack 14 for rotating the turn table is secured also to the lower side of the turn-table frame 11 along the outer periphery of the latter.

Figure 4:
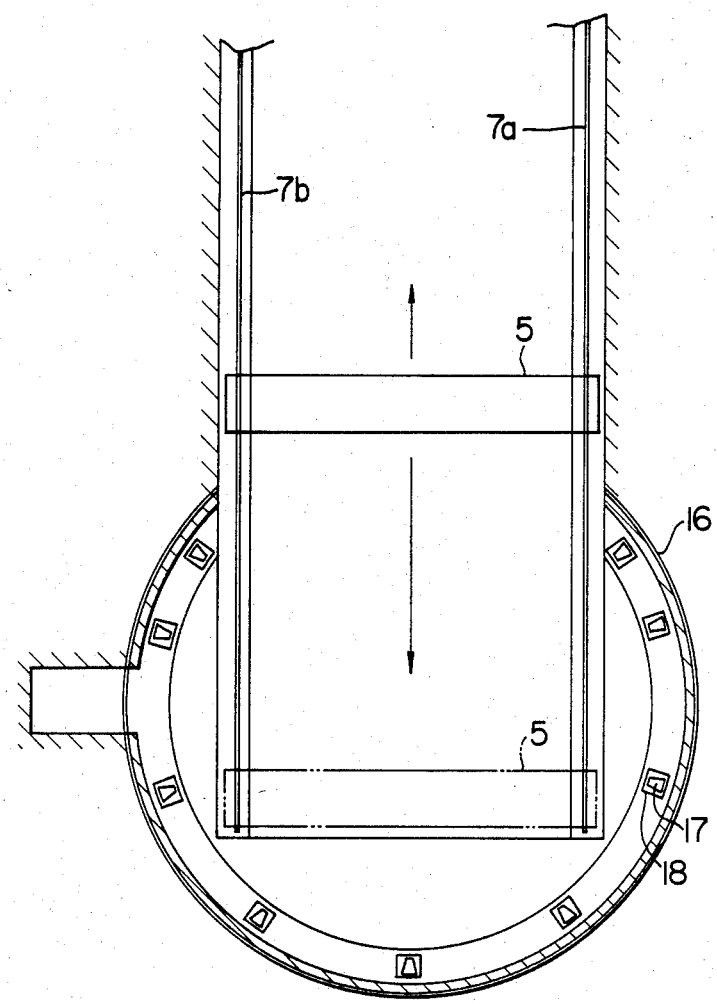
FIG. 4 is an enlarged plan view showing a dock in the embodiment shown in FIG. 1 together with a lower portion of a turn-table shifting means.

The main guide roller 17 and the column 18 are disposed at a plurality of positions along the circumference of the turn table as shown in FIG. 4 thereby attaining a uniform distribution of the load. In order to provide a passage for the lower washing unit 5, the portion of the circle of the turn table within the span of the lower washing unit 5 is devoid of the main guide roller 17 and the column 18.

Figure 2B:
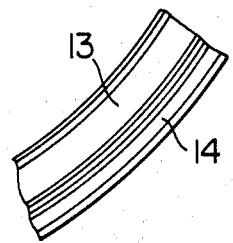
FIG. 2b is a rear elevational view taken along the line IIb—IIb of FIG. 2.

As will be understood from FIGS. 2a and 3, side rollers 15 are disposed on the outer side surface of the turn table frame 11 at a constant pitch, thereby to prevent any lateral movement or tilting of the turn table 10. The side guide rail 16 of the stationary side, cooperating with the side rollers 15, is arranged as shown by a double line shown in FIG. 4.

As will be understood from FIGS. 1 and 2a, the aforementioned rails 12a, 12b are disposed on the upper surface of the turn-table frame 11 on the extension of the rails 6a, 6b so that the upper washing unit 4 coming along the rails 6a, 6b can move onto the turn table 10 along the rails 12a, 12b.

An example of the construction of the upper washing unit 4 will be explained hereinunder with reference to FIGS. 5, 5a and 5b.

Figure 5B:
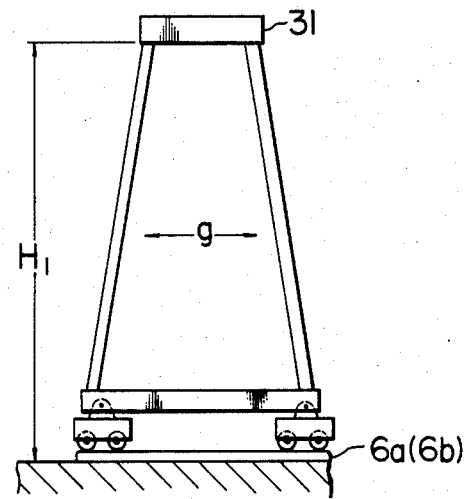
FIG. 5b is a side elevational view of the carrier.
Figure 6:
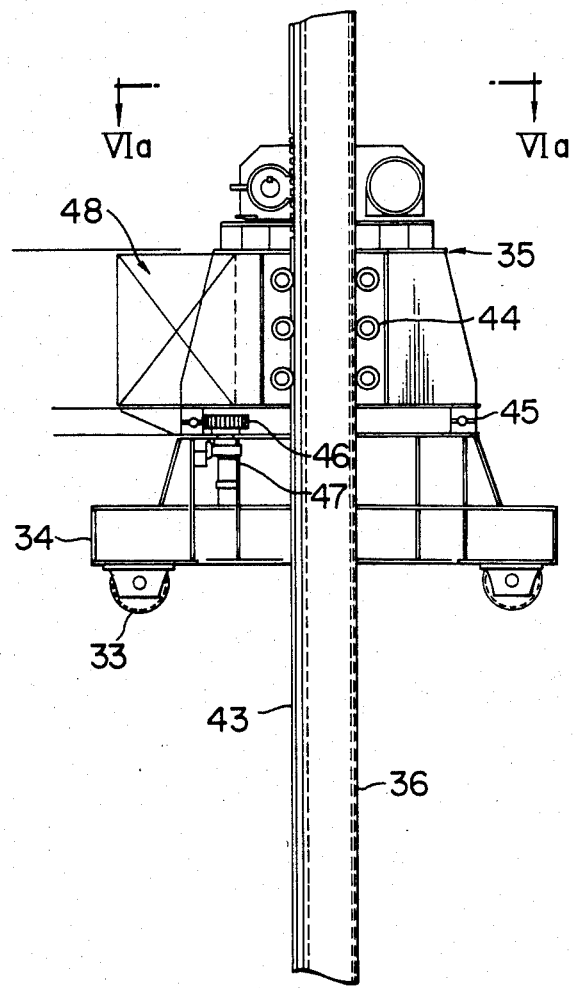
FIG. 6 is an enlarged front elevational view of a washing truck adapted to run along the carrier.
Figure 6A:
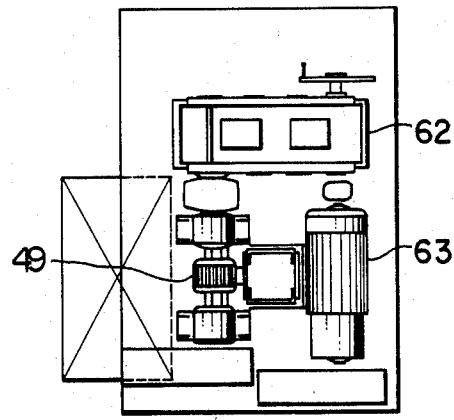
FIG. 6a is a plan view taken along the line VIa—VIa of FIG. 6.

As will be understood from these Figures, the upper washing unit 4 has a gate-type carrier 31 similar to a goliath crane which is known per se. A pair of washing trucks 32 are adapted to run along transverse rails 42 laid on the upper surface of the carrier 31. The span $L_3$ and the height $H_1$ of the carrier 31 are selected to permit the carrier 31 to clear the horizontal tail wings and vertical tail wing of the airplane 3. The carrier 31 is movable as indicated by arrows g in FIG. 5b. Two washing trucks 32 are disposed in symmetry with respect to the airplane 3. A base truck 34 has four or more wheels 33 and runs along the transverse rails 42 as indicated by arrows a and a', in the same manner as the crab of an overhead crane which is known per se. The base truck 34 carries a turret 35 which can rotate as indicated by arrows b. A liftable post 36 is mounted through the center of the turret 35 for upward and downward movement as indicated by arrows d and d'. The rotation of the turret 35 and the vertical movement of the liftable post 36 can be realized by, for example, an arrangement as shown in FIG. 6. Namely, the rotation of the turret 35 is caused by driving an internally-toothed swivel bearing 45 by means of a pinion 46 which in turn is driven by a speed reducer 47 incorporating a brake disk. On the other hand, the vertical movement of the liftable post 36 is effected by an electric motor 63, through a reduction gear 62, lifting pinion 49 and a rack 43 as shown in FIG. 6a.

Figure 5:
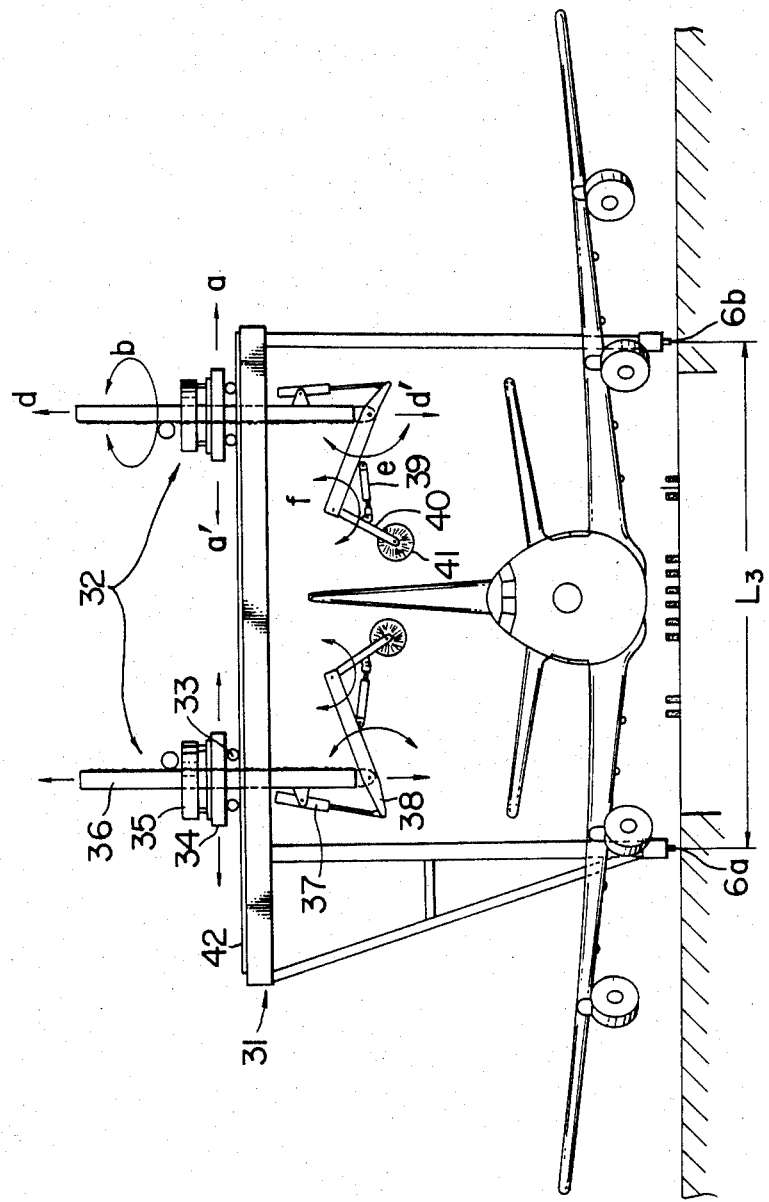
FIG. 5 is a front elevational view showing the detail of an upper washing unit incorporated in the embodiment shown in FIG. 1.
Figure 5A:
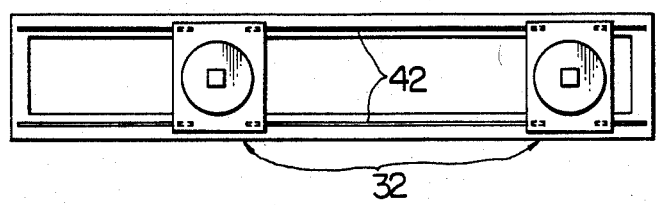
FIG. 5a is a top plan view of a carrier for the upper washing unit as shown in FIG. 5.

As will be seen from FIG. 5, a first arm 38 is pivotally secured to the lower end of the liftable post 36. The first arm 38 is swingable as indicated by arrows e, by the operation of an actuator 37. A second arm 40 pivotally connected to the free end of the first arm 38 can swing as indicated by arrows f by the operation of an actuator 39. A washing brush 41 is rotatably carried by the free end of the second arm 40. The brush 41 is adapted to be driven by, for example, a hydraulic motor. This arrangement including the arms and actuators is well known in the field of, for example, construction machinery and, hence, no further detailed description will be given.

Referring now to FIG. 7, the lower washing unit 5 has a carrier 51 similar to that of an overhead crane and adapted to run along the rails 7a, 7b laid on the bottom of the underground dock as indicated by arrows B. Two washing trucks 50 are adapted to run along rails 52 on the carrier 51. The washing trucks 50 are disposed in symmetry with each other with respect to the airplane 3. The construction of the washing truck 50 is the same as that of the washing truck 32 of the upper washing unit, except that the arms and the brush are secured to the upper end of the liftable post.

Figure 8:
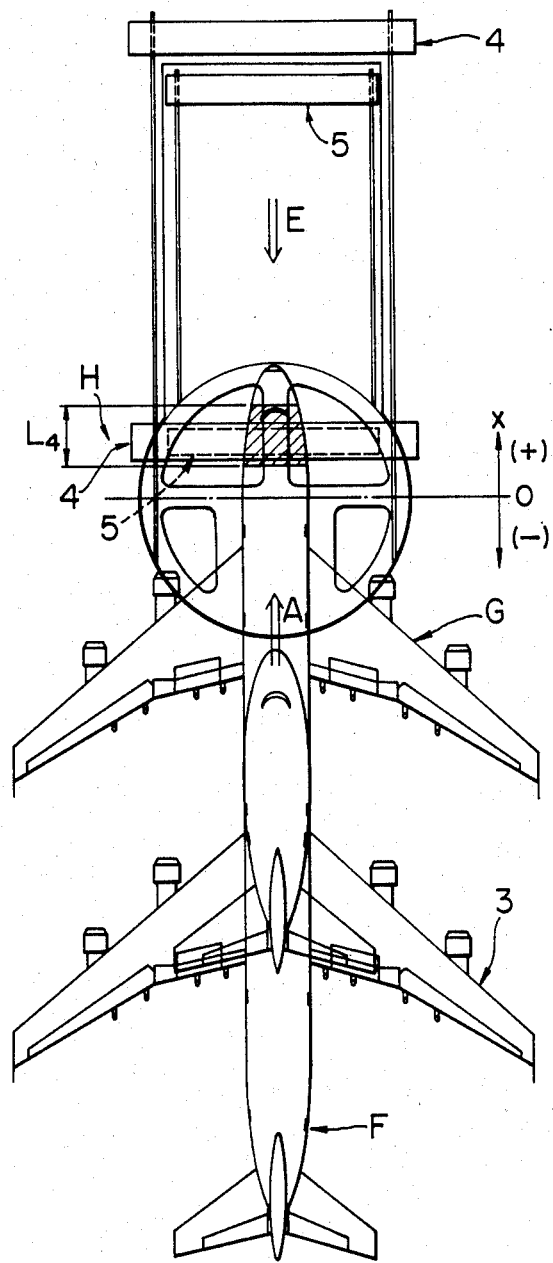
FIG. 8 is a plan view of the washing apparatus shown in FIG. 1, illustrating the positional relationship between an airplane and the upper and lower washing units stationed for washing and cleaning the portion of the airplane near the nose thereof.

In operation, referring to FIG. 8, the airplane 3 runs by itself onto the turn-table apparatus 2 as indicated by the arrow A and stops at a position G which is slightly back from the final washing position shown in FIG. 1. If the airplane is directly moved into the final washing position, some portion of the airplane cannot be accessed by the washing units, particularly the lower washing unit 5, due to interference with the turn-table frame 11. Therefore, the airplane 3 is made to stop first at the position G and the portions which will become inaccessible when the airplane is stationed at the final washing position are washed in a manner explained hereinunder. When the airplane 3 is stationed at the position G, the upper and lower washing units 4 and 5 are moved from the storage position shown at the upper side of FIG. 8 to positions H shown by full lines and broken lines, respectively. As will be seen from FIG. 9, the region to be washed is divided into four sections 32a', 32b', 50a' and 50b' which are shared by the washing trucks 32a, 32b, 50a and 50b, respectively. The washing is conducted by moving the brushes 41 and 61 as indicated by arrows such that the brushes follow the contour of the airplane 3. The control of movement of the brushes may be conducted by a controller in the following manner. The positions of the upper and lower washing units 4 and 5 and the position of the shell of the airplane 3 are detected along an X axis using the center of the turn-table frame 11 as the point of origin, so that the positions of the washing units 4 and 5 relative to the airplane 3 are known. The data concerning the positions of the washing units 4 and 5 in relation to the configuration of the airplane 3 thus obtained are inputted to the controller. The controller delivers the instructions for controlling the movement of the washing trucks 32a, 32b, 50a and 50b. It is possible to obtain free movements of the brushes by combining the operation modes indicated by arrows a, a', b, d, d', e and f as shown in FIG. 5 and the operation modes indicated by arrows i, i', j, k, k', m and n as shown in FIG. 7. The combination of these operation modes for effecting the above-explained control of the brush positions can be attained without substantial difficulty by the current robot control technic, numerical control technic and so forth. The detection of the positions of the washing units 4, 5 relative to the airplane 3 also is conducted by a known technic by means of, for example, touch rollers, proximate switches or a distance detection technic employing an optical distance meter.

When the airplane is stationed at the position G, the brushes 61 and other associated parts of the lower washing unit 5 can be projected through the opening areas of the turn-table to access the airplane 3 carried by the turn-table apparatus 2.

Figure 9:
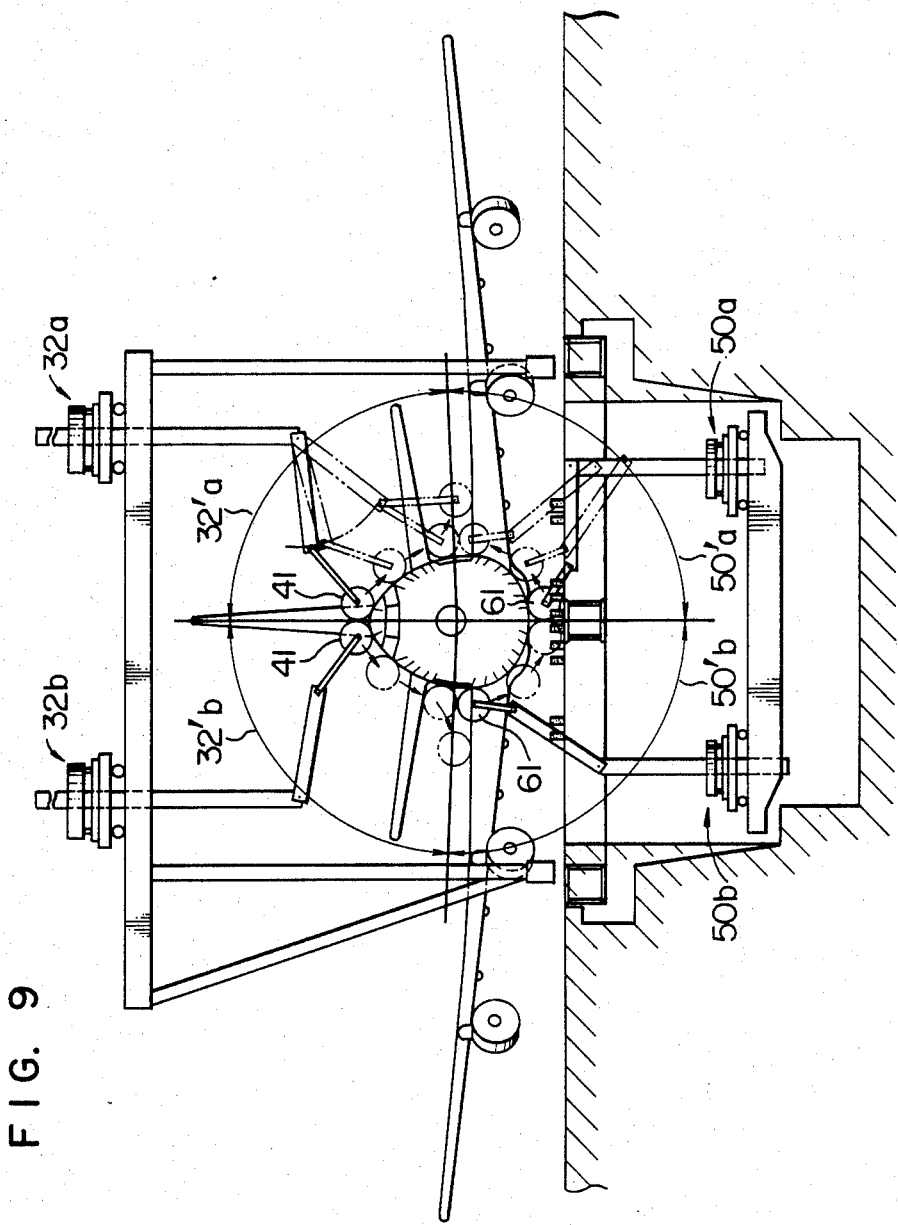
FIG. 9 is a front elevational view illustrating how the washing is conducted with the upper and lower washing units stationed as shown in FIG. 8.

One vertical stroke of each brush as indicated by arrows in FIG. 9 can clean only a belt-like area of a width corresponding to the axial length of the brush. It is, therefore, necessary to intermittently move each brush in the direction of the X-axis shown in FIG. 8 by a distance corresponding to the axial length of the brush at a suitable time interval until the hatched area of a length $L_4$ is washed and cleaned completely.

Figure 10:
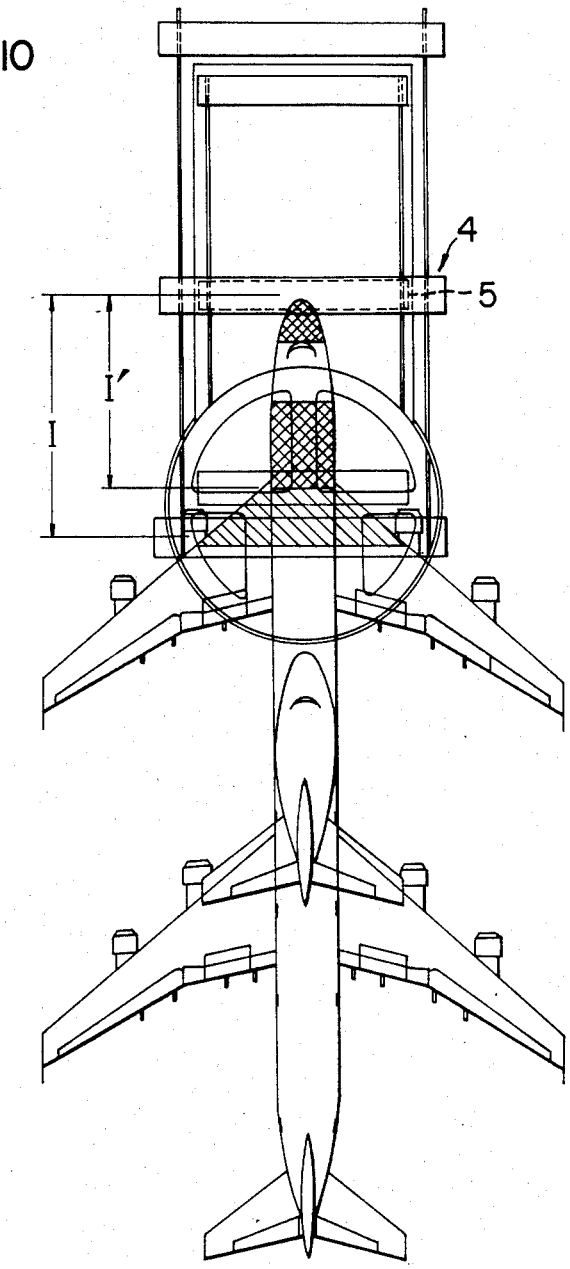
FIG. 10 is a plan view showing the portions of the airplane which are to be washed by the cleaning apparatus stationed at a position next to the position shown in FIG. 8, in which the hatched area (a) shows the portion to be washed by the upper washing unit, while the hatched area (b) shows the portions to be washed by the lower washing unit.
Figure 11:
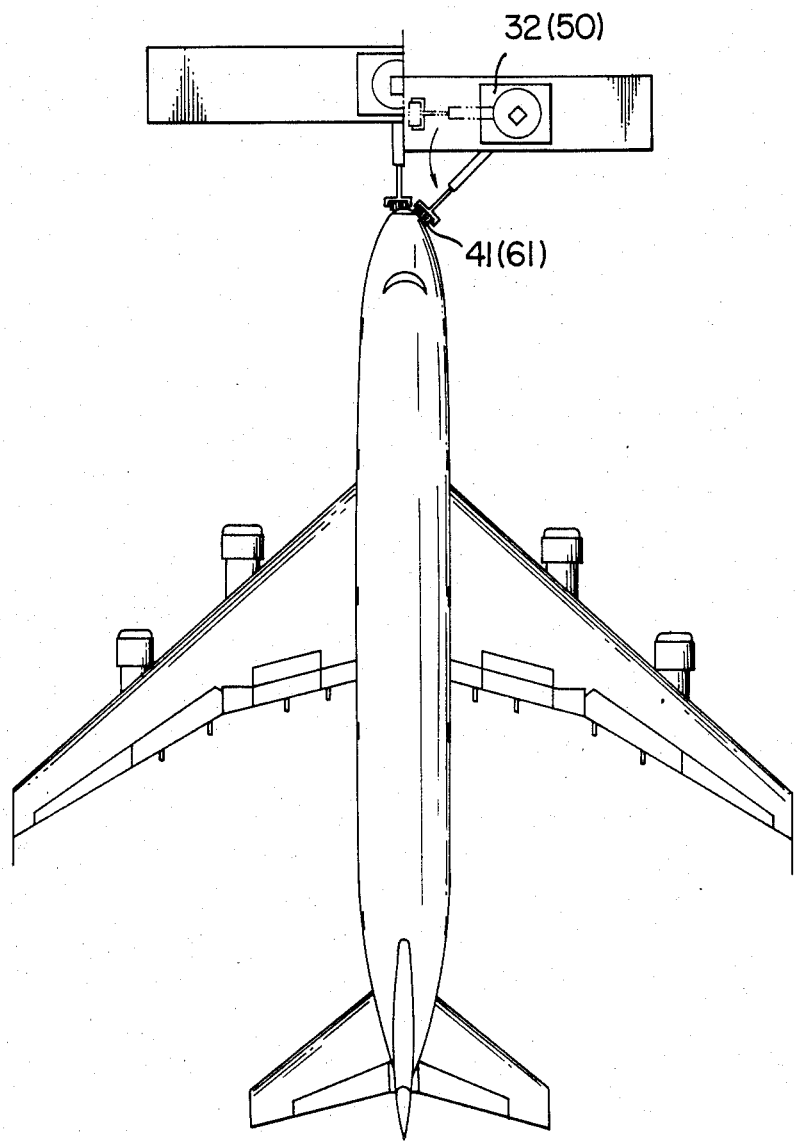
FIG. 11 is a plan view of the washing apparatus and an airplane, showing how the nose of the airplane is washed.

After the washing and cleaning of the hatched area in FIG. 8, the airplane 3 is further moved in the direction of the arrow A and is stationed at the final washing position as shown in FIG. 10. Then, the upper washing unit 4 and the lower washing unit 5 are moved within the ranges I and I' while making the same washing operation as that explained before, so that the hatched area (a) of the upper side of the airplane 3 and the hatched area (b) of the lower side of the same are washed and cleaned by respective washing units 4 and 5. As will be seen from FIG. 11, the washing of the nose of the airplane is effected by the same operation of the washing units as that for the straight portion of the airplane body, with the aid of the rotation mechanisms of respective washing trucks 32 and 50 which provide the rotation in the directions of arrows b and j in FIGS. 5 and 7, respectively.

Figure 12:
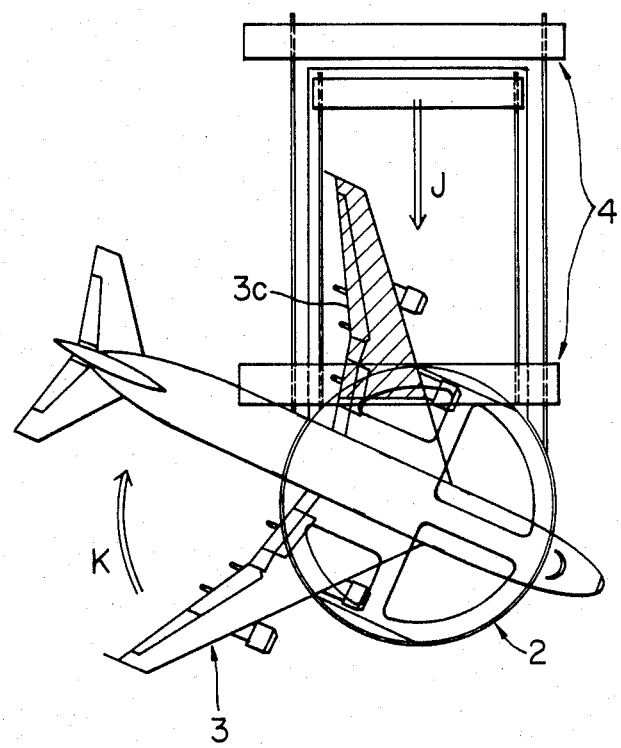
FIG. 12 is a plan view showing the positional relationship between an airplane and a washing apparatus stationed for washing the left main wing of the airplane.
Figure 13:
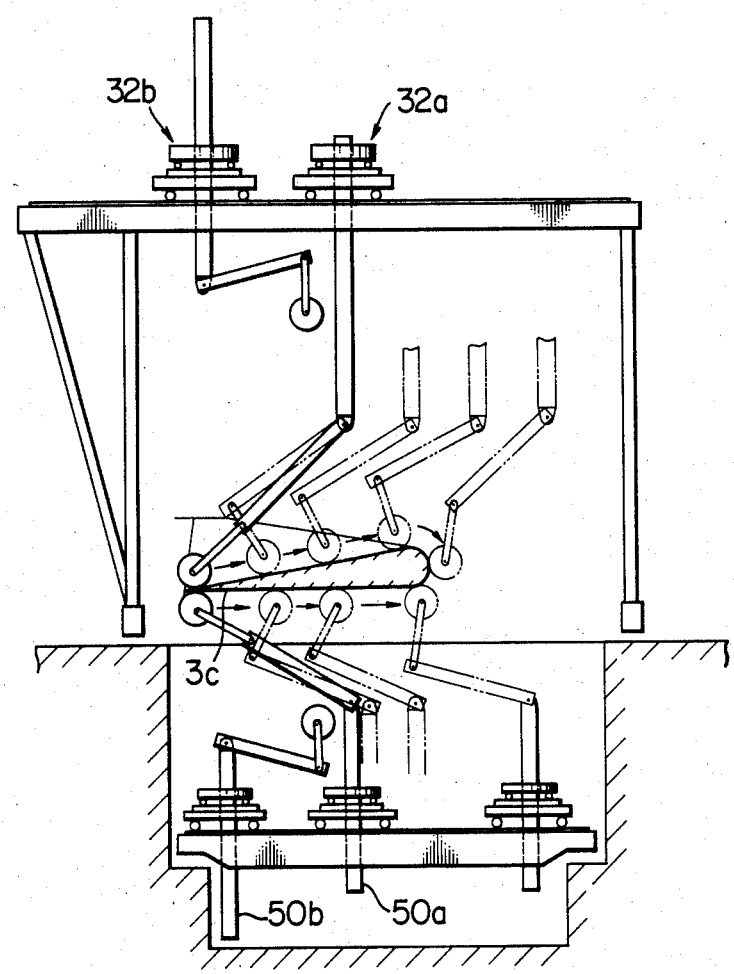
FIG. 13 is a front elevational view of the washing apparatus which is stationed at the position as shown in FIG. 12 while conducting the washing.

A description will be made hereinunder as to how the main wings are washed by the washing apparatus of the invention. According to the invention, one of the main wing is washed first and then the other main wing is washed. For washing one of the main wings, the turn-apparatus is rotated in the direction of an arrow K to bring the airplane to the position shown in FIG. 12. The upper and lower washing units 4 and 5 are beforehand retracted to the storage position, i.e. the end of the underground pit 1 opposite to the turn-table apparatus 2, before the rotation of the turn table, so that the main wing 3c is not interferred by the carrier of the upper washing unit 4. After the airplane 3 is stationed at the position shown in FIG. 12, the upper and lower washing units 4 and 5 are moved in the direction of the arrow J to progressively wash the main wing 3c from the distal end to the proximal end. As will be seen from FIG. 13, the washing of the main wing can be made by using only one 32a of the washing trucks of the upper washing unit and only one 50a of the washing trucks of the lower washing unit, while the other washing trucks 32b and 50b are stationed. During the washing of the main wing 3c, the washing brushes operate substantially in the same manner as that in the washing of the body of the airplane, as will be seen from FIG. 13.

Figure 14:
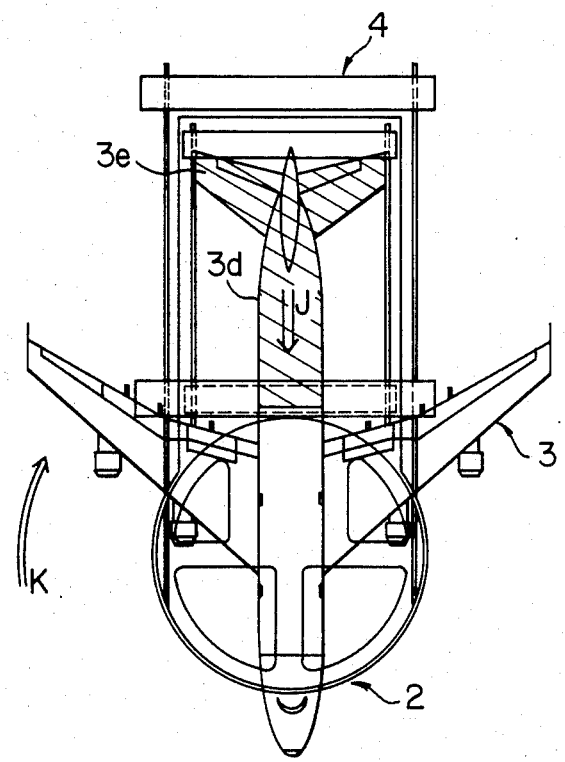
FIG. 14 is a plan view showing the positional relationship between the airplane and the washing apparatus which is stationed for washing the tail portion of the body and the tail wings of the airplane.
Figure 15:
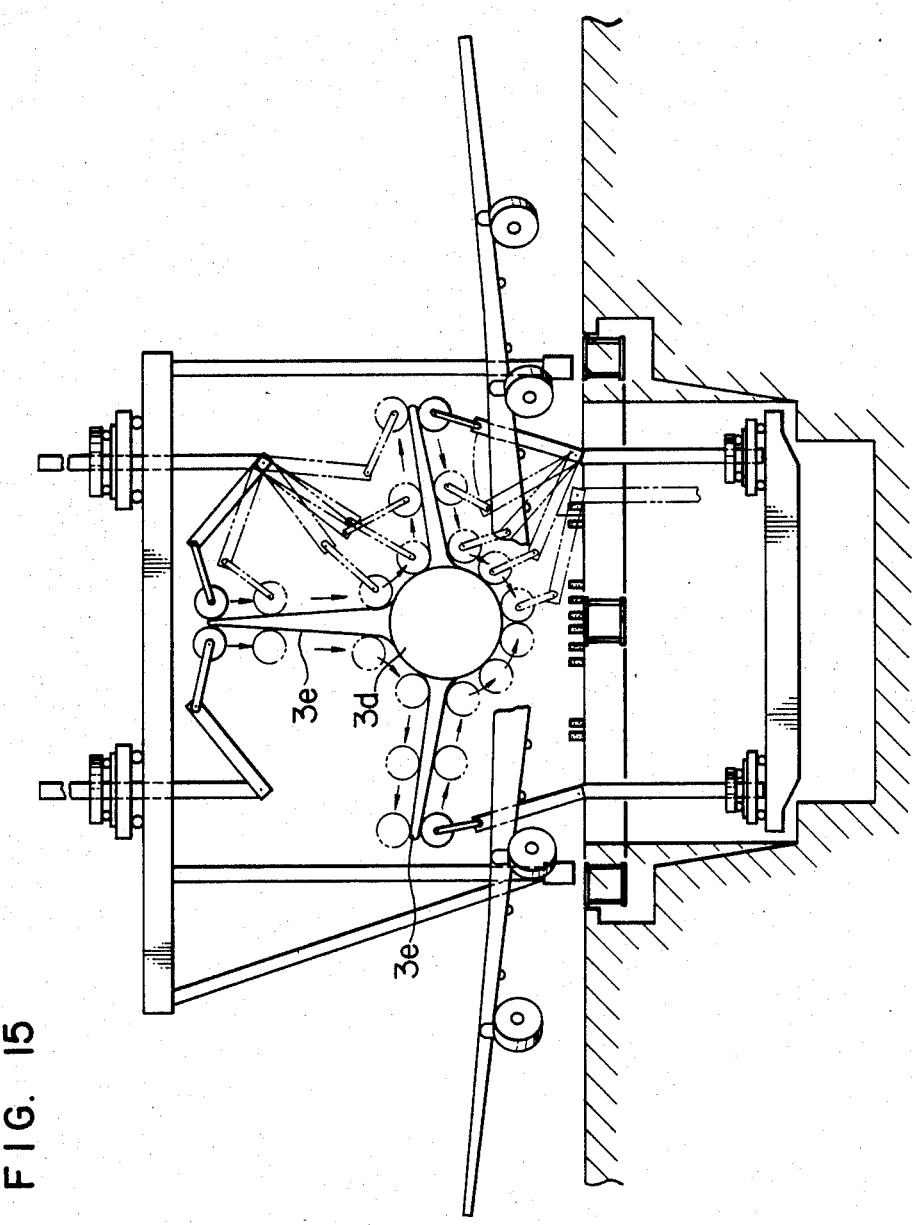
FIG. 15 is a front elevational view of the washing apparatus which is stationed at the position as shown in FIG. 14 while conducting the washing.

After the finishing of the main wing 3c, the turn-table apparatus 2 is rotated in the direction of the arrow K to the position shown in FIG. 14, to bring the tail end portion 3d of the body of the airplane and the tail wings 3e of the same to the washing position. Before the turn-table apparatus is rotated, the upper washing unit 4 is moved to the storage position to avoid interference with the tail portion of the airplane 3. Then, the portions of the airplane 3 hatched in FIG. 14 are washed in the same manner as that explained before in connection with FIGS. 10 and 9 by the upper and lower washing units 4 and 5 while these washing units are progressively moved in the direction of the arrow J. FIG. 15 shows the operation mode for washing the tail end portion of the body and the tailwings of the airplane. As explained before, the positions of the brushes are controlled by a controller which stores the data concerning the brush positions in relation to the relative positions between the upper and lower washing units 4, 5 and the airplane 3 and delivers the instructions to respective actuators to move the brushes in accordance with the stored data.

Figure 16:
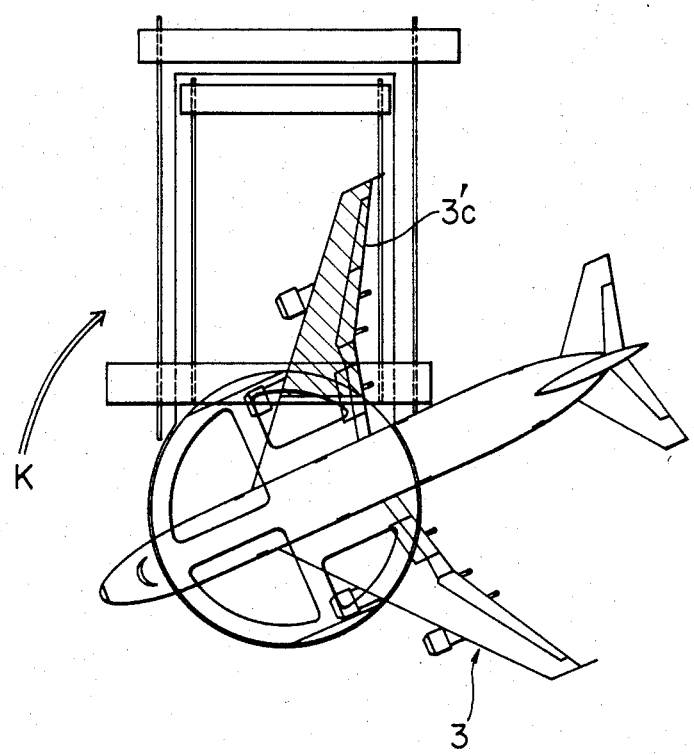
FIG. 16 is a plan view showing the positional relationship between the airplane and the washing apparatus stationed for washing the right main wing of the airplane.

After washing the tail end portion 3d of the body of the airplane and the tail wings 3e, the turn-table apparatus 2 is further rotated in the direction of the arrow K to bring the other main wing 3c' to the washing position as shown in FIG. 16, and the washing operation same as that for the first main wing 3c is conducted to wash the second main wing 3c'.

Figure 17:
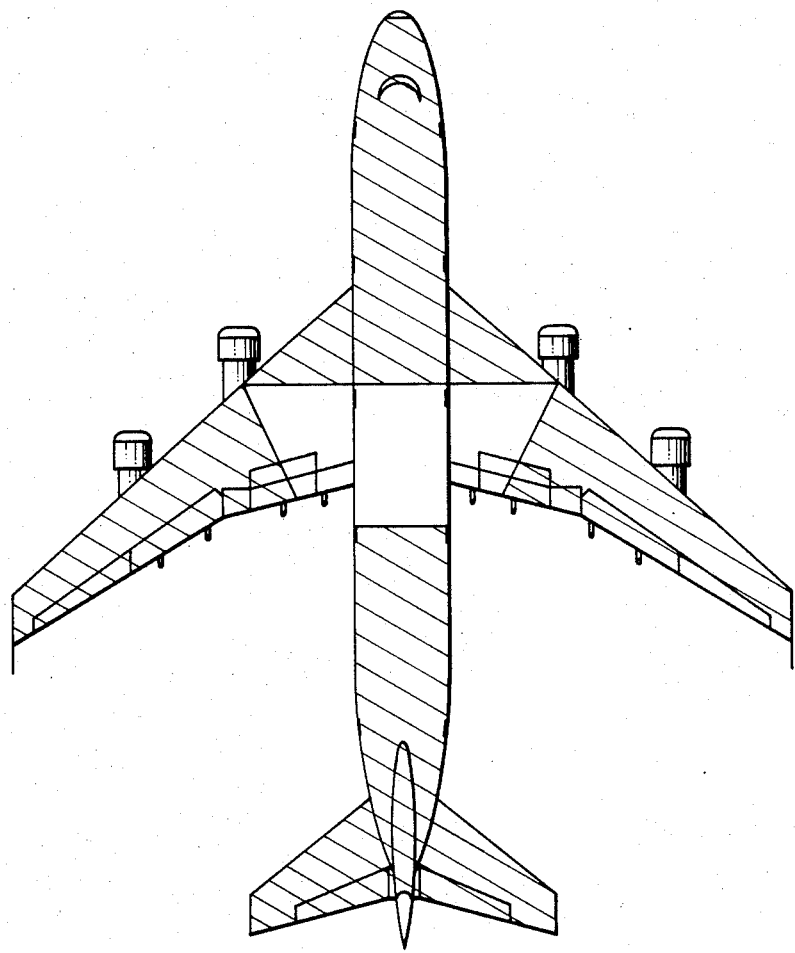
FIG. 17 is a plan view of an airplane, showing the portion of the upper side of the airplane left unwashed.
Figure 18:
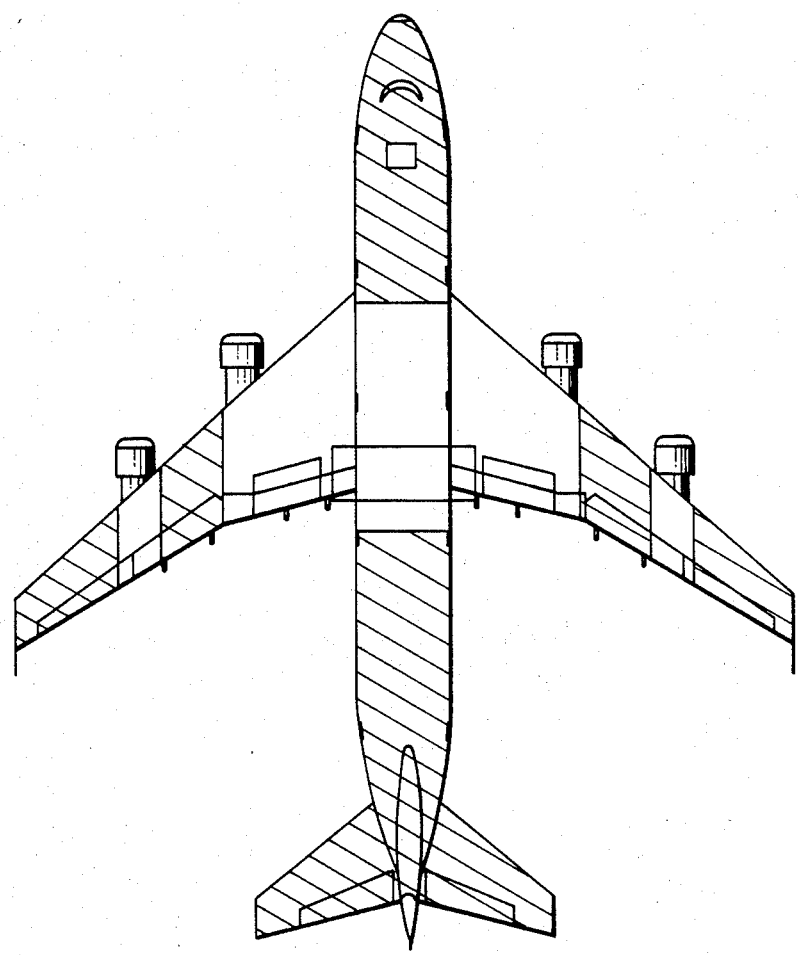
FIG. 18 is a plan view showing the portion of the lower side of the airplane left unwashed.

The hatched area of the upper side of the airplane as shown in FIG. 17 and the hatched area of the lower side of the airplane as shown in FIG. 18 are washed by a series of washing operation explained in connection with FIGS. 8, 10, 12, 14 and 16.

Thus, the white blank areas in FIGS. 17 and 18 are left unwashed on the upper and lower sides of the airplane. According to the invention, these unwashed areas can be washed in a manner explained hereinunder. The washing units are accessible to these unwashed areas in various ways.

Figure 19:
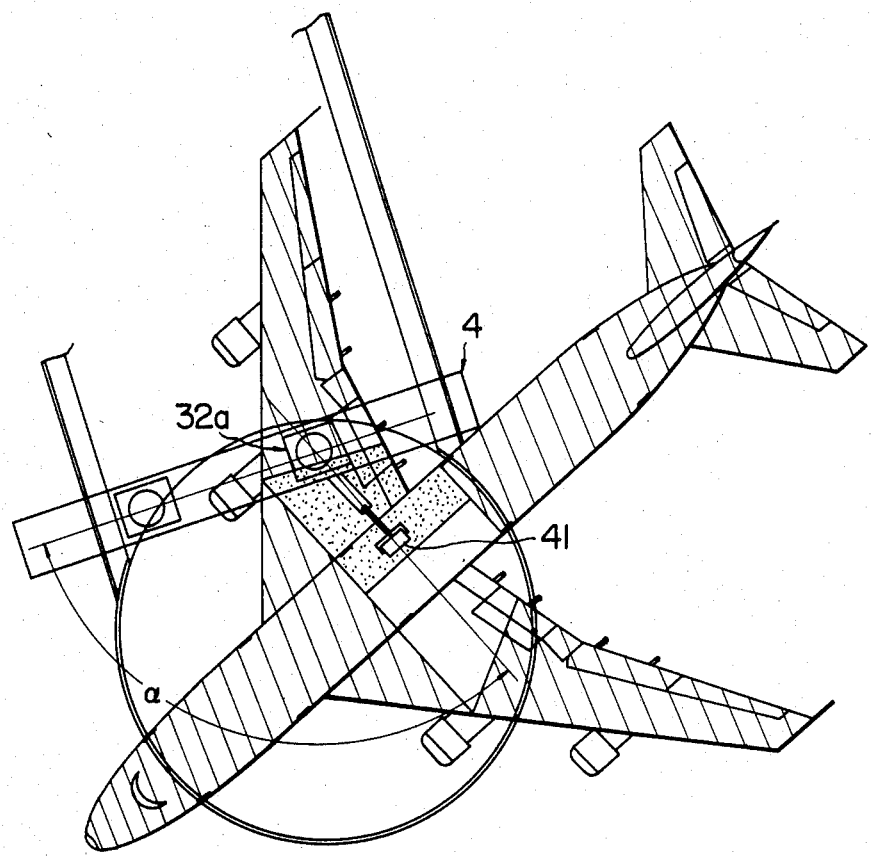
FIG. 19 is a plan view illustrating how the unwashed portion shown in FIG. 17 is washed by the washing apparatus of the invention.

FIG. 19 shows how the upper washing unit 4 makes an access to the unwashed area on the upper side of the airplane. In FIG. 19, the airplane is stationed at the position after the washing of the second main wing 3c'. In this state, the arms supporting the brush 41 of one of the washing trucks 32a of the upper washing unit 4 is rotated in the direction of the arrow b through an angle $\alpha$ as shown in FIG. 19, by the rotation of the turret 35. In this state, the brush 41 takes the same positional relationship to the airplane as that shown in FIG. 9, so that it can wash the right half part of the unwashed area of the upper side, i.e. the base portion of the second main wing 3c' and the adjacent portion of the airplane body, in the manner explained before in connection with FIG. 9. Similarly, the left half part of the unwashed area of the upper side can be washed after the washing of the first main wing 3c explained before in connection with FIG. 12.

The unwashed area of the lower side of the airplane can be washed either by a first method (a) or a second method (b) explained below.

Figure 20:
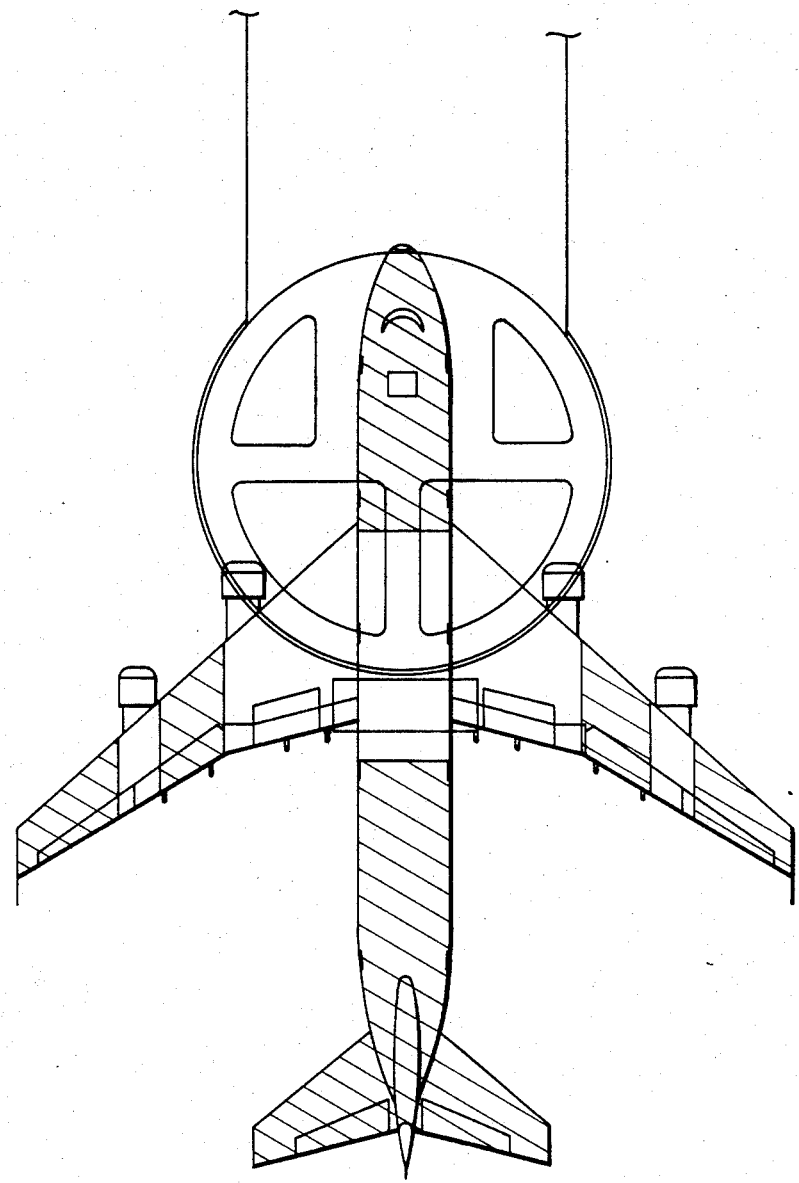
FIG. 20 is a plan view illustrating a method of washing the unwashed portion shown in FIG. 18 by the washing apparatus of the invention.
Figure 21:
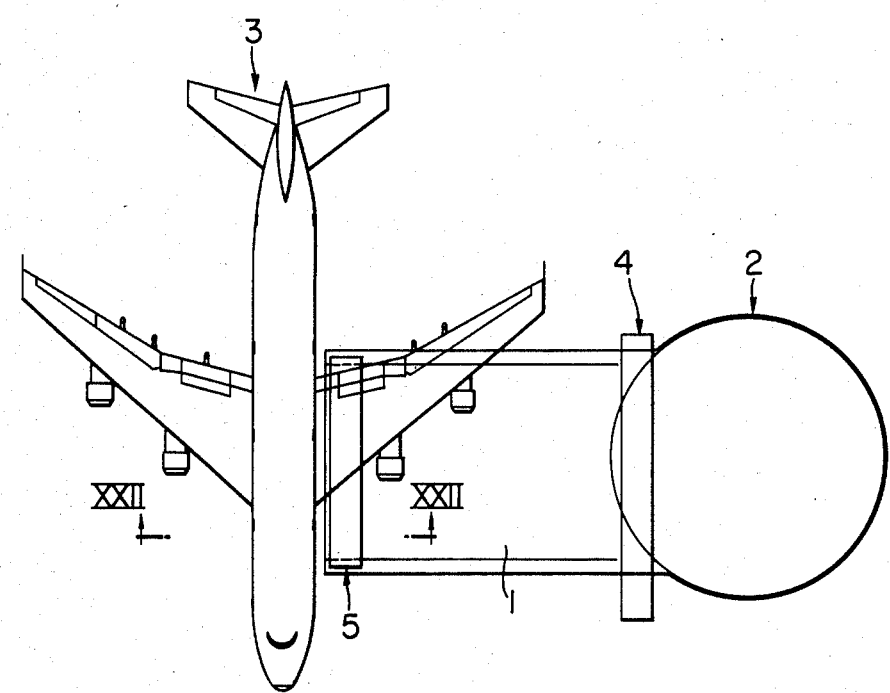
FIG. 21 is a plan view illustrating another method of washing the unwashed portion shown in FIG. 18 by the washing apparatus of the invention.

(a) After rotating the turn-table apparatus 2 to the position shown in FIG. 1, the airplane 3 is moved aback out of the turn-table apparatus 2. After a 180° rotation of the turn-table apparatus 2, the airplane is moved in the direction of the arrow A and stationed on the turn-table apparatus as shown in FIG. 20. Then, the lower washing unit 4 is moved to the starting end as shown in FIG. 4 and the brushes 61 are raised through the openings in the turn table to wash the unwashed area on the lower side of the airplane shown in FIG. 18. The washing operation in this state well resembles that explained before in connection with FIG. 9.

Figure 22:
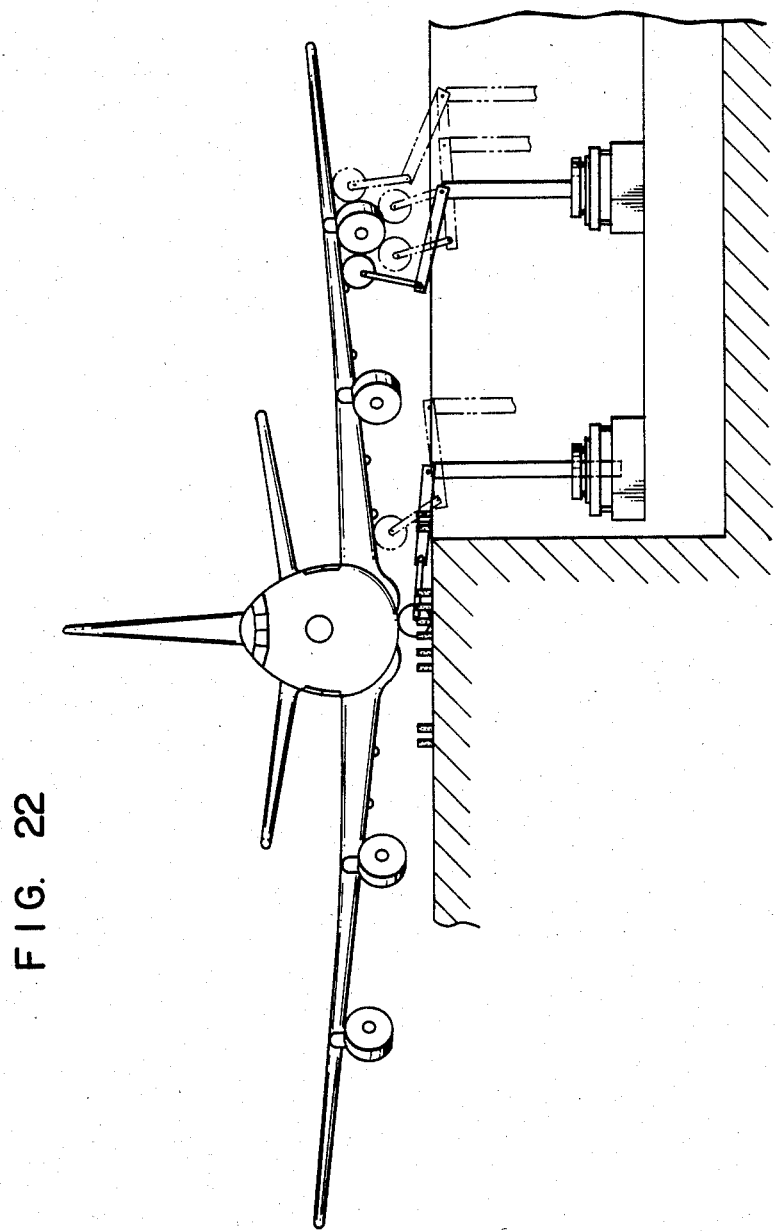
FIG. 22 is a front elevational view of the washing apparatus while conducting the washing by the method as shown in FIG. 21.

(b) The airplane 3 is stationed at the opposite side of the underground pit 1 to the turn-table apparatus 2. The lower washing unit 5 is stationed at the storing position adjacent to the airplane 3, while the upper washing unit 4 is positioned at the same side of the underground pit 1 as the turn-table apparatus 2. Then, the unwashed portion of the lower side of the airplane 3 is washed by the lower washing unit 5 as illustrated in FIG. 22. In this state, it is possible to wash also the casings of the engines.

As has been described, according to the invention, it is possible to wash all portions of the upper and lower sides of the airplane only by two washing units: namely, an upper washing unit and a lower washing unit. In addition, by placing the lower washing unit under the ground, it becomes possible to easily wash the lower side and the engine casing of the air plane which could not easily be wash by the known washing method. Furthermore, the airplane can be precisely positioned with respect to the washing apparatus thanks to the use of the turn-table apparatus. Moreover, the reduced number of washing units permits an easy mechanization and automation of the washing apparatus to contribute to the saving of human labour and facilitate an unmanned washing of airplane which will be demanded in the future.

What is claimed is:

1. An apparatus for washing an airplane comprising: an underground pit recessed below a ground surface; a turn-table means having an upper surface disposed at the same level as said ground surface at one longitudinal end of said pit and extending over said pit, and means for controllably rotating said turn-table;

means for supporting an airplane to be washed on said turn-table means to be rotated therewith, whereby selected portions of said airplane may be rotated to be positioned over said pit;

an upper carrier means supported at each side of said pit and arranged to extend transversely over said pit from one side to another at a height sufficient to clear at least said selected portions of an airplane to be washed, said upper carrier means being movable longitudinally to said pit to positions over said selected portions of said airplane supported on said turn-table means and to positions away from said airplane;

a lower carrier means disposed traversely in said pit to be supported at the bottom thereof and movable in the longitudinal direction of said pit to positions under said selected portions of said airplane supported on said turn-table means and away therefrom; and at least one washing means movably carried by each of said upper and lower carrier means, each of said washing means being controllably positionable to wash selected portions of said airplane supported on said turn-table means.

2. An apparatus for washing an airplane according to claim 1, wherein said washing means includes a rotary brush.

3. An apparatus for washing an airplane according to claim 1 or 2, wherein said upper carrier means has a supporting member extending transversely of said airplane stationed on said turn-table means at a level above the vertical tail wing of said airplane, while said lower carrier means has a supporting member extending transversely of said pit at a level near the bottom of said pit, and wherein said washing means are supported by respective truck means through universal supporting means which permits changes of position and orientation of said washing means, said truck means being adapted to run along supporting members of respective carrier means.

4. An apparatus for washing an airplane according to claim 3, wherein each of said universal supporting means includes: a turret rotatably carried by said truck means, a liftable post mounted on said turret for upward and downward movement; a first arm pivotally connected to one end of said liftable post and swingable within vertical planes; and a second arm pivotally secured to the free end of said first arm and swingable within vertical planes, said second arm carrying said washing means at its free end.

5. An apparatus for washing an airplane according to claim 4, wherein said universal supporting means of each of said carrier means movably carries a pair of truck means which carry said washing means through said supporting means.

6. A washing apparatus for washing an airplane according to claim 5, wherein said means for supporting an airplane extends in symmetry with respect to one diametrical line of said turn table, said means for supporting having a first half part with a width large enough to carry the front wheels of said airplane and a second half part with a width large enough to carry rear wheels of said airplane, the areas at both sides of said means for supporting being opened to permit said washing means of said lower carrier means to pass therethrough to access said airplane in accordance with the movexent of said liftable post.

7. A method of cleaning an airplane comprising:

stationing said airplane on a turn-table means rotatable on a ground surface and wherein an underground pit is recessed below said ground surface, said pit being covered at one end by said turn-table means;

washing portions on the upper and lower sides of said airplane which are accessible to upper and lower washing means;

moving said upper and lower washing means with respect to said turn-table means within a limited range;

moving an upper carrier means in the longitudinal direction of said pit, said upper carrier means straddling over said airplane, said upper carrier means movably carrying said upper washing means;

moving a lower carrier means within said pit in the longitudinal direction of said pit and underneath said airplane, said lower carrier means movably carrying said lower washing means;

rotating said turn-table means by a predetermined angle and washing portions of said upper and lower sides of said airplane which have thereby become accessible to said washing means wherein said upper and lower washing means wash said upper and lower sides of said airplane simultaneously;

further rotating said turn-table means intermittently to make different portions of said upper and lower sides of said airplane accessible to said washing units thereby to wash all portions of said upper and lower sides of said airplane.

* * * * *